(12) United States Patent
Gharavi

(10) Patent No.: US 7,016,580 B1
(45) Date of Patent: Mar. 21, 2006

(54) GRATING- AND POLYMER-BASED OPTICAL ATTENUATORS AND MODULATORS

(75) Inventor: Alireza Gharavi, Chicago, IL (US)

(73) Assignee: Trans Photonics, L.L.C., Chicago, IL (US)

(*) Notice: Subject to any disclaimer, the term of this patent is extended or adjusted under 35 U.S.C. 154(b) by 114 days.

(21) Appl. No.: 10/606,132

(22) Filed: Jun. 25, 2003

Related U.S. Application Data

(60) Provisional application No. 60/391,544, filed on Jun. 25, 2002.

(51) Int. Cl.
*G02B 6/00* (2006.01)

(52) U.S. Cl. .................................................. 385/122

(58) Field of Classification Search ............ 385/2, 385/8, 10, 16, 31, 50, 53, 131, 130, 132, 385/143, 145, 122–129; 430/270.1, 906
See application file for complete search history.

(56) References Cited

U.S. PATENT DOCUMENTS

| | | | | |
|---|---|---|---|---|
| 5,319,492 | A * | 6/1994 | Dorn et al. ................ | 359/296 |
| 5,887,116 | A | 3/1999 | Grote ........................ | 385/2 |
| 6,091,879 | A * | 7/2000 | Chan et al. ................ | 385/143 |
| 6,194,120 | B1 * | 2/2001 | Chan et al. ............... | 430/270.1 |
| 6,661,942 | B1 * | 12/2003 | Gharavi ..................... | 385/16 |
| 6,665,479 | B1 * | 12/2003 | Gharavi ..................... | 385/122 |
| 2001/0046363 | A1 | 11/2001 | Purchase et al. ........... | 385/140 |
| 2002/0009274 | A1 | 1/2002 | Gharavi ..................... | 385/122 |
| 2002/0018636 | A1 | 2/2002 | Bischel et al. ............. | 385/140 |
| 2002/0048073 | A1 | 4/2002 | Kawawada et al. ......... | 359/230 |
| 2002/0063942 | A1 | 5/2002 | Fischer et al. ............. | 359/286 |
| 2004/0096179 | A1 * | 5/2004 | Bintz et al. ................ | 385/142 |

FOREIGN PATENT DOCUMENTS

| | | |
|---|---|---|
| WO | WO 01/06240 | 1/2001 |
| WO | WO 01/06305 | 1/2001 |
| WO | WO 02/33005 | 4/2002 |
| WO | WO 02/071557 | 9/2002 |

OTHER PUBLICATIONS

Levy et al., "Reflection Method for Electro-optical Coefficient Determination in Stratified Thin film structures," *Mol. Cryst. Liq. Cryst. Sci. Technol.-Sec.B: Nonlinear Optics 4*: 1-19 (1993).

Reinisch et al., "Fast Pockets Light Modulator Using Guided Wave Resonance," *Applied Optics 24*: 2001 (1985).

Saadeh et al., "A New Synthetic Approach to Novel Polymers Exhibiting Large Electrooptic Coefficients and High Thermal Stability," *Macromolecules 33*: 1570 (2000).

Saadeh et al., "Highly Stable, Functionalized Polyimides for Second Order Nonlinear Optics," *J. Mater. Chem. 9*: 1865 (1999).

Saadeh et al., "A Multifunctional Photorefractive Material Showing High Optical Gain and Diffraction Efficiency," *Advanced Materials 10(12)*: 927-931 (1998).

(Continued)

*Primary Examiner*—Akm Enayet Ullah
(74) *Attorney, Agent, or Firm*—Marshall, Gerstein & Borun LLP

(57) ABSTRACT

Among other things, the present invention provides optical attenuators and modulators, especially variable optical attenuators and modulators, and materials and methods for their fabrication. In particular, the invention provides optical attenuators and modulators that preferably are comprised of a second-order nonlinear optical polymer. Desirably the attenuators and modulators comprise at least one grating, and even more preferably, comprise at least two gratings. Optimally any such grating is contained within a waveguide layer.

22 Claims, 7 Drawing Sheets

OTHER PUBLICATIONS

Saadeh et al., "Polyimides with a Diazo Chromophore Exhibiting High Thermal Stability and Large Electrooptic Coefficients," *Macromolecules* 30(*18*): 5403-5407 (1997).

Saadeh et al., "Polymides with a Diazo Chromophore Exhibiting Large Electro-optic Coefficients," *Polymer Preprints 38: 552* (1997).

SBIR Abstract, SBIR Phase I Grant to Alireza Gharavi, "Mid-Infrared Stacked Waveguide Laser Arrays with Organic Light Emitting Diodes", Fiscal Year 2000 [available at http://www.winbmdo.com/scripts/sbiabstract.asp].

SBIR Abstract, SBIR Phase I Grant to Alireza Gharavi, "Optical Materials: Water-Soluble Polyimides", Fiscal Year 2002 [available at http://www.winbmdo.com/scripts/sbir/abstract.asp].

Sekkat et al., "Room-Temperature Photoinduced Poling and Thermal Poling of a Rigid Main-Chain Polymer with Polar Azo Dyes in the Side Chain," *Chem. Mater.* 7: 142-147 (1995).

STTR Abstract, STTR Phase I Grant to Alireza Gharavi, "A Multi-Functional Optical Switch: A WDM, Add/Drop Multiplexer and Cross-Connect Device", Fiscal Year 1998 [available at http://www.winbmdo.com/scripts/sbir/abstract.asp].

Van, J., "Broadband dream hits snag: Americans unwilling to pay premium for high-speed web access," *Chicago Tribune*, B6, Nov. 12, 2001.

Yu et al., "Highly Stable Copolyimides for Second-Order Nonlinear Optics," *Macromolecules*; 29: 6139-6142 (1996).

Yu et al., "Multifunctional Polymers Exhibiting Photorefractive Effects," *Accounts of Chemical Research*, 29(1): 13-21 (1996).

Yu et al., "A Generic Approach to Functionalizing Aromatic Polyimides for Second-Order Nonlinear Optics," *Macromolecules*, 28: 784 (1995).

Yu et al., "Novel second-order nonlinear optical, aromatic, and aliphatic polyimides exhibiting high-temperature stability," *Appl. Phys. Lett.*, 66: 1050 (1995).

Yu et al., "Development of Functionalized Polyimides for Second-Order Nonlinear Optics," *ASC Symposium Series* No. 601, Chapter 13, 172 (1995).

Yu et al., "Novel Aromatic Polyimides for Nonlinear Optics," *Polymer Preprints*, 36: 39 (1995).

Yu et al., "Novel second-order nonlinear optical polyimides," *SPIE Proceedings*, 2527: 12 (1995).

Yu et al., "Novel Aromatic Polyimides for Nonlinear Optics," *J. Am. Chem. Soc.*, 117: 11680 (1995).

\* cited by examiner

GRATING- AND POLYMER-BASED OPTICAL ATTENUATORS AND MODULATORS

CROSS REFERENCE TO RELATED APPLICATIONS

This application claims the benefit of provisional U.S. patent application Ser. No. 60/391,544 filed Jun. 25, 2002.

TECHNICAL FIELD

The present invention relates to optical attenuators and modulators, especially to variable optical attenuators and modulators. In particular, the invention relates to optical attenuators and modulators that preferably are comprised of second-order nonlinear optical polymers. Desirably the attenuators and modulators have at least one grating.

BACKGROUND

It is well known that the greatest cost of building a fiber-optic network is laying the fiber. Thus, when carriers lay fiber, they tend to lay fibers in which only some of the fibers carry data traffic, and the rest of the fibers carry no data (i.e., are dark). In addition to the dark fiber, many companies also lay dark conduit, i.e., empty pipes through which new fiber can be pulled based on future need. In principle, the current supply of bandwidth could outstrip demand by as much as 20 or 30 times. However, the laying of long distance fiber has caused carriers to neglect the metropolitan area networks. Accordingly, demand exists for bandwidth in the metropolitan areas. Out of 110 million homes in the United States, around 50 million have at least one computer. Of those homes, only 8.3 million had cable modems at the end of 2001, and only 3.4 million had DSL (digital subscriber line) service. That leaves a sizable market for high-speed Internet access (i.e., broadband, or connections greater than about 128 kilobits per second) untapped. Taking a page from the semiconductor industry, where Moore's law has the number of processors on a computer chip doubling approximately every 18 months, analysts speculate that optical networks will grow at a similar rate. Traffic should double every year for the rest of the decade ("Too Much Fiber?" Optics & Photonics News, March 2002, pp. 32–37).

One commonly cited reason for low customer broadband demand is that many people do not want to pay extra money to make their Internet go faster ("Broadband dream hits snag: Americans unwilling to pay premium for high-speed web access", by Jon Van, *Chicago Tribune*, Nov. 12, 2001, Business Section pg. 6). Such cost-sensitive customers, as well as telephone and Internet users globally (particularly those in large metropolitan areas), would benefit from faster data connection rates at reduced costs. This means that the demand for bandwidth will continue to grow, and telecommunications companies will keep looking for ways to squeeze more data through the fiber optic pipelines and ultimately connect these pipelines to users in metropolitan areas.

One way to squeeze more data in a fiber optic pipeline and connect to metropolitan users is to implement an optical switching device that is fast, and costs little. Such a device, a multi-functional optical switch (e.g., optical wavelength division multiplexer, optical wavelength division demultiplexer, optical add-drop multiplexer and/or optical interconnect device) is described, for instance, in PCT International Application No. WO 01/06305.

Among other things, PCT International Application No. WO 01/06305 discusses gratings-based resonance coupling to transfer light between different waveguides, wherein the waveguides in which the gratings are present are comprised of second-order nonlinear optical (2°-NLO) polymers (see, e.g., in particular, Example 8). The '305 application describes that if a grating is designed for resonance coupling for the wavelength λ and angle θ, then a small bias across the grating (i.e., produced by applying voltage to the electrodes) will shift the resonance enough so that the coupling will not occur. If a grating is designed so that the coupling is slightly off resonance, a small bias across the grating will change the index of refraction of the 2°-NLO waveguide to "tune in" to the resonance condition for wavelength λ. This configuration, therefore, can act as a multiplexer (or, conversely, demultiplexer), as a modulator, a filter, and a reflector, among other things. The bandwidth of a given channel in the 1.5 μm optical communication band is typically a fraction of a nanometer. Therefore the active grating needs to tune over the range of a nanometer. PCT International Application No. WO 01/06305 describes and encompasses multi-grating devices. Many of the devices, depicted, however, employ a single grating to effect transfer between two waveguide layers. With use of a single grating for such transfer, switching of signal between layers may capture only a portion (e.g., either the front, middle, or tail end) of the signal, not its entirety.

U.S. Patent Application No. 2002/0009274 also describes tuning of the grating by means of a distributed Bragg reflector (DBR) tuning electrode (see, e.g., Example 7). This reference describes the use of this, and other, gratings in a waveguide amplifier and/or laser. By comparison, and apart from any considerations regarding tunability of devices, in optical communications systems, it frequently is necessary or desirable to adjust (with precision) optical signal levels entering various system components. Adjustment of optical signals (e.g., levels) can be achieved by incorporating optical attenuators or optical modulators into the optical circuits. Attenuators and/or modulators are known in the art (e.g., and are described, for instance, in U.S. Patent Application Nos, 2001/0046363, 2002/0018636, 2002/0048073, and 2002/0063942).

However, there exists a need in the art for polymer-based modulators and/or attenuators, e.g., particularly those that are adapted to interface with polymer-based optical devices, such as those described in PCT International Application WO 01/06305. Accordingly, the present invention provides an optical attenuator and/or modulator, especially a variable optical attenuator and/or modulator. These novel devices optionally can be employed to assist with and/or facilitate transfer of data, e.g., in a fiber optic pipeline. These and other objects and advantages of the present invention, as well as additional inventive features, will be apparent from the following description of the invention provided herein.

BRIEF SUMMARY

The present invention relates to optical attenuators and modulators, especially to variable optical attenuators and modulators. In particular, the invention relates to optical attenuators and modulators that preferably comprise a waveguide layer that includes a waveguide comprised of a second-order nonlinear optical polymer. Desirably the waveguide layer also comprises at least a first and a second grating. Optimally the optical attenuators and modulators include a means for communicating a negative electric field to the first grating, and a means for communicating a positive electric field to the second grating. Also, in another embodiment, preferably the waveguide layer comprises at least one grating, and includes a means for communicating a negative electric field to one end of the grating, and a means for communicating a positive electric field to the opposite end of the grating. When more than one grating is present, optimally each grating is contained in the waveguide present in the waveguide layer.

BRIEF DESCRIPTION OF THE FIGURES

FIG. 6A depicts the situation where no voltage is applied to the electrode controlling either grating and consequently, no light is transmitted (i.e., with the trough at about 1560.5 nm due to the overlapping signals from the two gratings, and the peak at about 1560.5 nm due to the signal from the waveguide). FIG. 6B depicts the situation where supplying each grating with opposite fields (e.g., applying a negative voltage to an electrode communicating a negative electric field to a first grating, and applying a positive voltage to an electrode communicating a positive electric field to a second grating) shifts the signals from the gratings in opposite directions (i.e., with the signal from the first and second gratings producing the troughs at about 1560.2 nm and 1560.8 nm, and the peak at about 1560.5 being due to the waveguide signal). FIG. 6C depicts the situation where increasing the voltage applied to electrode controlling each grating shifts the spectral window observed for each grating farther apart until all the spectral power of the existing channel is allowed to pass through, i.e., with the signal from the first and second gratings producing the troughs at about 1559.6 nm and 1561.6 nm, and the peak at about 1560.5 being due to the waveguide signal.

DETAILED DESCRIPTION

Figure 1A:
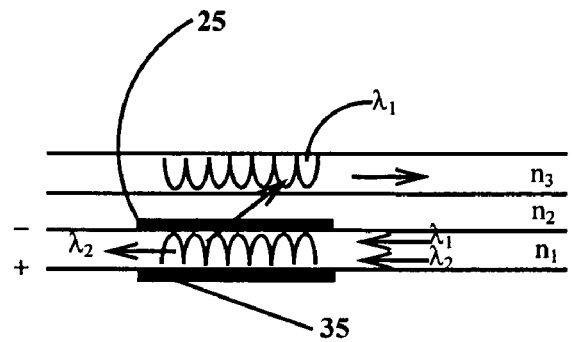
FIG. 1A is a representation of a 2×2 active switch fabricated with two polymeric core layers, and which is capable of wavelength selective operations, where $n_1$ and $n_3$ are the refractive indices of different second-order nonlinear optical polymers (e.g., polyimide-alkoxy sulfone diazo, polyimide-dialkyl amino nitro azo, and/or polyimide-dialkyl amino nitro diazo, especially modified versions thereof), $n_2$ is the refractive index of the buffer layer, and the refractive index can be changed by applying an electric field across the waveguide. Symbols: 25 (solid bar), top electrode (preferably transparent such as an ITO electrode or a very thin metal); 35 (solid bar), bottom electrode; λ1 and λ2, wavelengths; spirals, Braggs-Gratings; +/−, applied electric field.
Figure 1B:
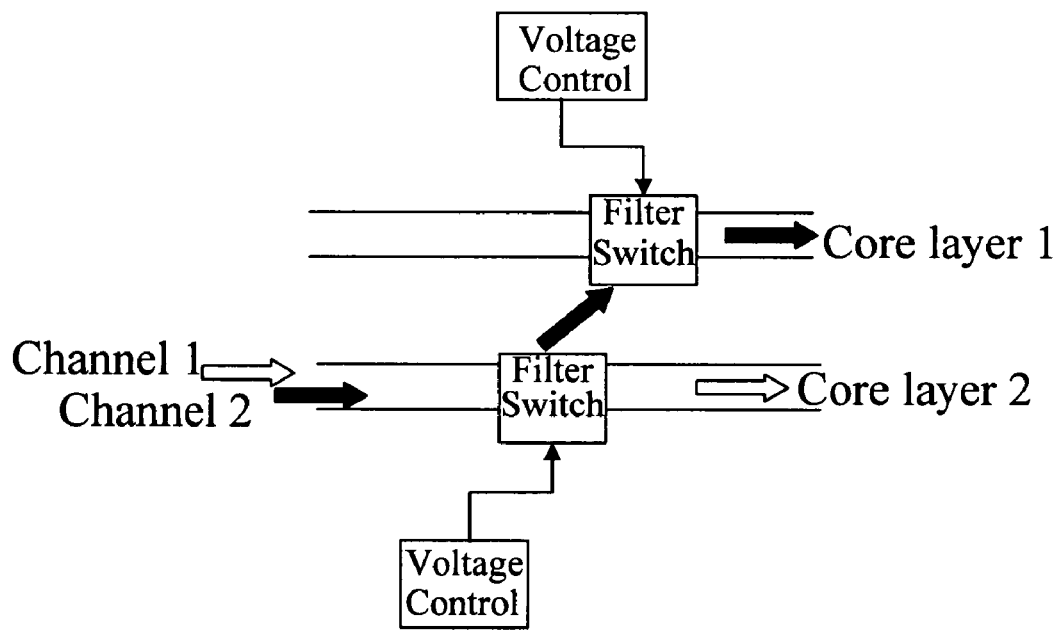
FIG. 1B is a schematic of the 2×2 active switch depicted in FIG. 1A fabricated with two polymeric core layers, and which is capable of wavelength selective operations. Symbols: Open arrow, Channel 1; Solid arrow, Channel 2.

A family of multi-functional optical switches is described, for instance, in PCT International Application No. WO 01/06305. A representative switch as described in this reference is depicted in FIGS. 1A and 1B. The present invention provides, among other things, preferred optical attenuators and/or modulators, especially variable optical attenuators and/or modulators, e.g., that can be employed in optical networks to assist with or facilitate transmission of optical signals.

In particular, the invention described herein provides variable optical attenuators and/or modulators comprising a waveguide layer that is comprised in part or entirety of a second-order nonlinear optical polymer. Such 2°-NLO polymers optionally are comprised of chromophores such as those described in PCT International Application No. WO 01/06305, and/or are polymers as set forth in FIG. 2, and/or are other appropriate polymers as further described herein.

Preferably the invention comprises variable optical attenuators and/or modulators that comprise at least two gratings, and optionally, comprise a single-core layer, or a multiplicity of single-core layers. In particular, desirably the attenuators and modulators comprise at least a first and second grating present in the waveguide layer. The invention also comprises variable optical attenuators and/or modulators that preferably comprise at least one grating present in the waveguide layer (either as single-core, or multiple-core devices). Preferably according to the invention when more than one grating is present, the gratings are contained in (e.g., adjacent to one another) in the same waveguide. Such devices desirably include a means for communicating a negative electric field to one end of the single grating (or to one of the gratings in a dual-grating device), and a means for communicating a positive electric field to the opposite end of the grating (or to the other of the gratings in a dual-grating device).

Optionally the invention comprises variable optical attenuators and/or modulators that are double-core layer devices (or comprise a multiplicity of double-core layers) for added functionalities and denser integration. Optimally the optical attenuators and/or modulators can form part of a system, e.g., with the aforementioned multi-functional optical switches, and/or with other devices.

Definitions

Certain standard terms are employed in describing the invention. Illustrative definitions of these terms are set out below, and in the Example which follows. Should there be any term that is left undefined, or any possible ambiguity in the meaning of a term, the broadest possible definition known in the optics/electronics/telecommunications fields that is consistent with the scope and goals of the invention is to be applied. Also, like numbering is used for the same components in the Figures and in the descriptive text.

According to the invention, preferably a "device" includes any single preferred entity as set forth herein (e.g., including, in particular, a waveguide, or a grating), or any combination of elements (e.g., attenuator, modulator, and the like) either alone, or, in a higher level of organization (e.g., present in a system or subsystem such as a board or motherboard, present as part of a telecommunications device, or other organization or device). Preferably these entities are employed in optical communication systems, although each may exist in any combination, or independently, or as part of a communications system or other system that is other than predominantly optical (i.e., a mix of optical and nonoptical systems). Desirably a device according to the invention is optically active or includes optically active components (as further described herein), although passive devices (or devices containing passive components) are also contemplated by and preferred according to the invention. However, one unifying feature of all the devices of the invention is their preferred incorporation of a second-order nonlinear optical (2°-NLO) polymer, particularly a polymer having electroluminescent properties that are appropriate for the particular application (e.g., infrared or ultraviolet), as further described below.

The expression "optical communication system" or "optical system" as used herein refers to any system which employs optical signals to convey information across an optical waveguide medium. Such optical systems include, but are not limited to, telecommunications systems, cable television systems, local area networks (LANs), and the like.

A light "modulator" (e.g., an electro-optic modulator) is an optical device in which a signal-controlled element (as described herein, an element such as at least one grating and even more preferably, two gratings) is used to modulate a beam of light. According to the invention, the modulation can be imposed on the phase, amplitude, or direction of the modulated beam. Attenuation refers to a decrease or dampening in signal strength along an optic waveguide. A light "attenuator" thus refers to an optical device which is like a modulator in that the device modulates (e.g., reduces) the light in amount or intensity, but not in a "fast" manner. An attenuator can be analogized to a dimmer on a light switch. If biasing on the gratings (i.e., by applying negative and positive voltage to separate electrodes, communicating negative and positive electric fields to separate gratings, or opposite ends of a single grating, as further described herein) is done slowly, attenuation is obtained, whereas more rapid alteration on biasing of gratings results in modulation.

Preferably the optical attenuators and/or modulators of the invention are "variable", i.e., are dynamically programmable, or capable of varying the amount of attenuation or modulation in response to a control. Such variability can be effected, e.g., by the bias on the gratings, and by the amount, nature and timing of voltage applied to the electrode acting upon each grating.

These devices according to the invention desirably can be employed in networks, e.g., optical networks, especially those that are more complex. In particular, attenuators optimally are useful, for instance, in equalizing optical signal between channels, and thus maximizing power control. For instance, attenuators can be employed, e.g., to equalize or block individual channels, to compensate for variation in transmission losses on individual channels, and to effectively block or attenuate a channel completely. Optical signal power must be managed carefully in optics communications systems, and attenuators can be employed to avoid exposing devices in the systems (e.g., detectors) to excessive or damaging signal levels.

Modulators are useful, for instance, in modulating unpolarized light. Other uses are well known and would be apparent to one skilled in the art.

A "second-order nonlinear optical" (2°-NLO) polymer is a polymer that is optically active—i.e., its index of refraction changes due to an applied electric field, and the change is proportional to the square of the applied electric field. Preferably according to the invention, a 2°-NLO polymer is obtained by the incorporation into a polymer backbone of a chromophore having 2°-NLO characteristics, and/or which exhibits those characteristics when present in the polymer backbone. A 2°-NLO polymer according to the invention optionally can be a polymer blend. Optimally, a 2°-NLO polymer is as described in PCT International Application No. WO 01/06305, or is a variation of the one of the polymers described therein, or is a polymer comprising the azo or stilbene chromophores described in PCT International Application WO 02/33005 or U.S. Patent Application Publication No. U.S. 2002-0009274, or a variation thereof.

A "channel" carries a string of information, e.g., optical information. A "waveguide" is an entity of material boundaries or structures for guiding electromagnetic waves. More specifically, a waveguide is an optical waveguide, or any structure capable of guiding optical power (i.e., carrying one or more optical signals). According to the invention, a waveguide preferably is comprised of a layer of 2°-NLO polymer, optionally which exhibits electroluminescence. Desirably the waveguide is flanked on at least one side by a solid support (e.g., a substrate layer) capable of supporting the waveguide, wherein the solid support can be any appropriate material, e.g., glass, plastic, metal, and the like. The solid support need not be entirely rigid (although completely rigid materials can be employed), but can have some amount of flexibility. Preferably the waveguide also is flanked on at least one side by cladding. Whenever a solid support is employed to support the waveguide, the support must not directly contact the waveguide, but preferably must be separated from the waveguide by cladding. Depending on the proper functioning of the waveguide (e.g., whether it is a component of an attenuator or of a modulator), the index of refraction in any layer that directly contacts the waveguide (i.e., on one or more sides, and preferably on all sides) may vary with respect to the index of refraction in the waveguide itself (e.g., may be greater than, less than, or equivalent to the waveguide's index of refraction).

Accordingly, cladding preferably can include one or more layers of any appropriate material, such as 2°-NLO polymer, glass, plastic, silica, or other appropriate material, and further can include a buffer. According to the invention, "a buffer" is an optical buffer, i.e., a medium that does not exhibit any optical activity or optical nonlinearity with lower refractive index. Optionally according to the invention, the cladding layers can be conductive, e.g., as described in U.S. Pat. No. 5,887,116 (incorporated by reference for its teaching regarding conductive cladding layers).

The index of refraction in each layer (e.g., of a waveguide or of an optical switch) is impacted, among other things, by the chromophore concentration, the nature of the chromophore, and the nature of the polymer backbone. Of course, these parameters can easily be optimized by one skilled in the art. Desirably, the waveguide can comprise any part of an optical device (e.g., preferably an attenuator or modulator). Similarly, any electroluminescence can vary due to extent of conjugation, planarity, carbon chain length, and other properties well known to those skilled in the art, and as further described herein.

To function as a waveguide as in the preferred embodiments of the invention, the index of refraction in any layer surrounding the waveguide preferably must be less than the index of refraction in the waveguide itself. This difference in refractive index between the waveguide itself and any adjacent layer (i.e., "Δn" in Example 2 of PCT International Application WO 01/06305) preferably is equal to or greater than 0.001, and desirably is no more than 0.1. However, with alternate thicknesses of waveguide, it is conceivable that the range of differences may be slightly broader. Such alternates are contemplated by the present invention.

An "active" device (or an active component of a device, such as a grating) according to the invention is one which responds to an applied electric field (e.g., by changing its properties). An active device must contain at least one active grating, but each waveguide present in the device (i.e., in the case of a device comprised of more than one waveguide) need not necessarily contain a grating. In other words, with an active device, its optical properties are changed when a voltage is applied to it. By comparison, a "passive" device (or a passive component of a device, such as a grating) according to the invention is one that does not change its characteristics when a voltage is applied to it, and/or a device that functions without needing to apply a voltage (i.e., and to which a voltage is not applied).

In particular, with respect to the Bragg grating, a passive reflector is one that is not tunable. It has no electric field control, e.g., it is a passive distributed Bragg reflector. Also, with no electric field applied to a grating, a passive Bragg reflector is obtained. By comparison, and as discussed in Example 8 of PCT WO 01/06305, the properties of a grating made of 2°-NLO polymer (e.g., the ability to reflect light at a particular angle) can be changed by application of an electric field. In particular, the angle of incident reflection can be adjusted by applying a voltage. The ability to control this angle provides for "tunability" of the reflective properties of the grating.

According to the invention, an "electric field" is generated with any appropriate power source, and is communicated to the device (e.g., to a grating present in a device) by an appropriate means, e.g., by an electrode, especially an "anode." Preferably the electrode is not in electric contact with the device, i.e., the affects achieved are due solely to the electric field generated and not due to conductance of electricity. Generally, according to the invention an electrode can powered by a small amount of voltage, e.g., from 0 to about 50 volts, especially from about 1 to about 10 volts, although in certain applications, it may be preferable to employ a higher voltage. Voltage optimally can be supplied by a DC power source. Preferably the electrodes do not touch each other, or come close enough to interfere with each other's function. With some locations of the electrodes it may be necessary or desirable to include a "ground" within the devices of the invention. In an electrical circuit, a ground, among other things, provides the zero voltage reference level (i.e., zero potential or ground potential).

The electrodes used in the present invention preferably are made of at least one of the following materials: metals such as gold, silver, platinum, copper, and alloys; conductive materials such carbon black, conductive epoxy, or indium-tin-oxide (ITO). In particular, with active devices, or active components of devices, preferably transparent electrodes can be incorporated in the form of layers of ITO, especially transparent layers of ITO. Under proper conditions ITO can form a thin film on a glass or polymer substrate which is electrically-conductive and optically-transparent in the ultraviolet to infrared region of the electromagnetic spectrum. It can be deposited as a thin film layer (typically 100 nanometer thickness) using an alloy of Indium and Tin and Oxygen atmosphere by reactive sputtering techniques. Reactive sputtering techniques include DC, RF, and Magnetron sputtering, and are known to those working in the field. However, any electrode having the ability to conduct charge and capable of functioning as an "electrode" as that term is understood in the art can be employed in the methods and devices of the invention.

Figure 3:
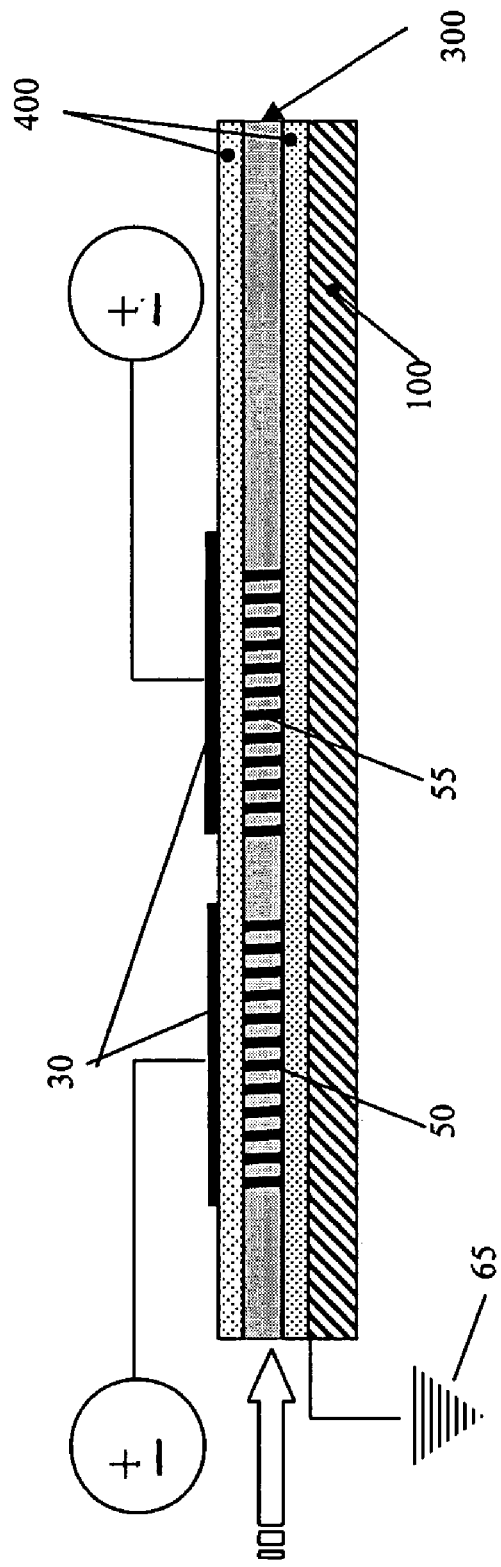
FIG. 3 depicts the architecture of a preferred gratings-based optical attenuator and/or modulator of the invention that preferably has two gratings. Symbols: 30 (solid bars), electrodes (preferably transparent such as an ITO electrode or a very thin metal); 50, first grating; 55, second grating; 65, ground; 100, ITO substrate; 400, claddings; +/−, applied electric field; 300, waveguide.

Further according to this invention, a "grating" is a means of separating an optical signal. A particularly preferred grating for use in the invention is a Bragg grating, especially a reflective Bragg grating, or a distributed Bragg grating (DBR). A "Bragg grating" is an element for selectively controlling specific wavelengths of light within a waveguide. A typical Bragg grating contains a length of waveguide that includes a plurality of periodic perturbations in the index of refraction, wherein the perturbations are substantially equally spaced along the length of the waveguide. These perturbations selectively reflect light having a wavelength ($\lambda$) equivalent to twice the spacing ($\Lambda$) between the successive perturbations (i.e., $\lambda=2n_{eff}\Lambda$, where $\lambda$ is the vacuum wavelength and $n_{eff}$ is the effective refractive index of the propagating mode). The light that is not selectively reflected by the Bragg grating passes through the grating unimpeded. Preferably according to the invention, the Bragg grating is made of 2°-NLO polymer. Especially preferred is the situation where the grating is formed of the same 2°-NLO polymer as is the waveguide. Preferably according to the invention, the Bragg grating (or other appropriate grating) is positioned directly within the waveguide layer (e.g., as depicted in FIG. 3). One of ordinary skill would be familiar with such alternate and appropriate positioning of the Bragg grating.

As depicted in FIG. 3, a preferred device according to the invention can comprise two gratings, or even more gratings, provided that the gratings are identical (or nearly identical) in terms of their perturbations. These gratings preferably are positioned with their perturbations in parallel. In terms of a range of distance between gratings, the lower end of the range is determined by the closeness with which such gratings can be positioned vis-à-vis each other such that the gratings are oppositely biased, by virtue of a positive electric field communicated to one of the gratings by one electrode, and a negative electric field communicated to the other grating by another electrode. The upper end of the range is determined by the distance over which signal can reasonably be propagated. Desirably, the gratings are positioned to from a distance of right next to each other (e.g., touching), to a distance as far as meters apart. Even more preferably, the gratings are separated by a distance that ranges from one micron to a few centimeters, especially from one micron to a few millimeters.

In another embodiment, a preferred device according to the invention can comprise a single grating. In this embodiment, preferably the opposite electric fields are applied to separate (opposite) ends of a single grating. For this embodiment, the size of the grating must be selected to ensure that the bias can be achieved by communicating a positive electric field to one end of the grating by one electrode, and by communicating a negative electric field to the other end of the grating by another oppositely-charged electrode. Thus, preferably the grating ranges in length from 1 to about a few centimeters.

Preferred Optical Attenuators and Modulators

A 2×2 multifunctional optical switch can be made that has WDM, add/drop and cross-connect functionality, as described in PCT International Application No. WO 01/06305. For this device, preferably five polymer layers (e.g., three cladding layers and two core layers) are stacked. However, a single core layer device (as also described in PCT International Application No. WO 01/06305) by itself can be used to produce other commercially valuable components. Such novel and nonobvious devices according to the present invention include, but are not limited to: optical attenuators and modulators; variable optical attenuators and modulators; and/or gratings-based modulators and attenuators, among others, particularly as described herein.

A preferred modulator and/or attenuator according to the invention is depicted in FIG. 3. This device depicted comprises two gratings, which optimally are controlled by separate electrodes. Both gratings preferably are fabricated with the same laser beam to ensure they are identical. Alternately, as previously described, the device can comprise a single grating, where the opposite ends of the grating are controlled by separate electrodes.

The modulators and attenuators of the invention rely on a principle called "spectral shift". This is exemplifed in FIGS.

Figure 4:
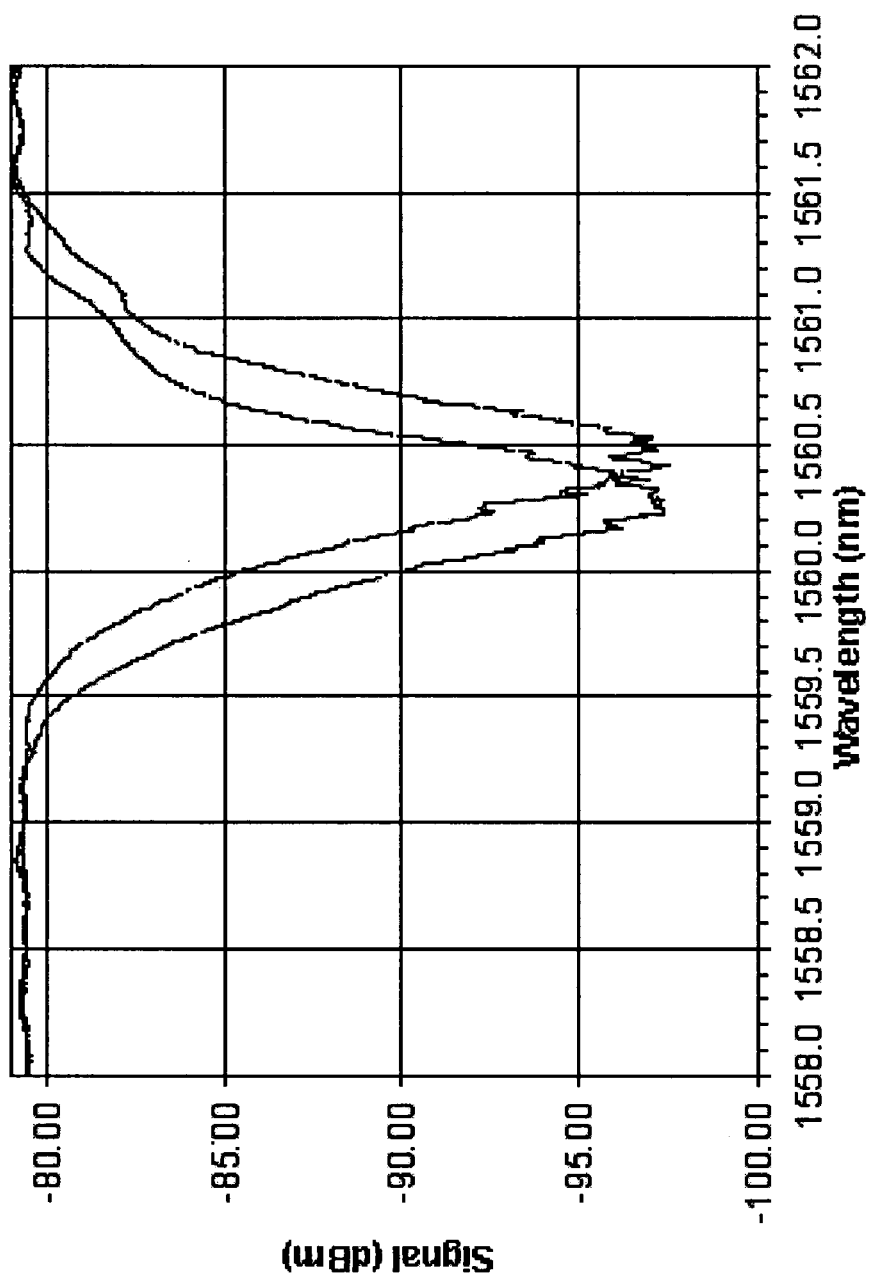
FIG. 4 is a graph of wavelength (nm) versus signal (dBM) that shows the spectral shift in Bragg wavelength due to an applied electric field in a poled sample of the dinitro analog of polyimide-dialkyl amino nitro diazo (depicted in FIG. 2C).
Figure 5:
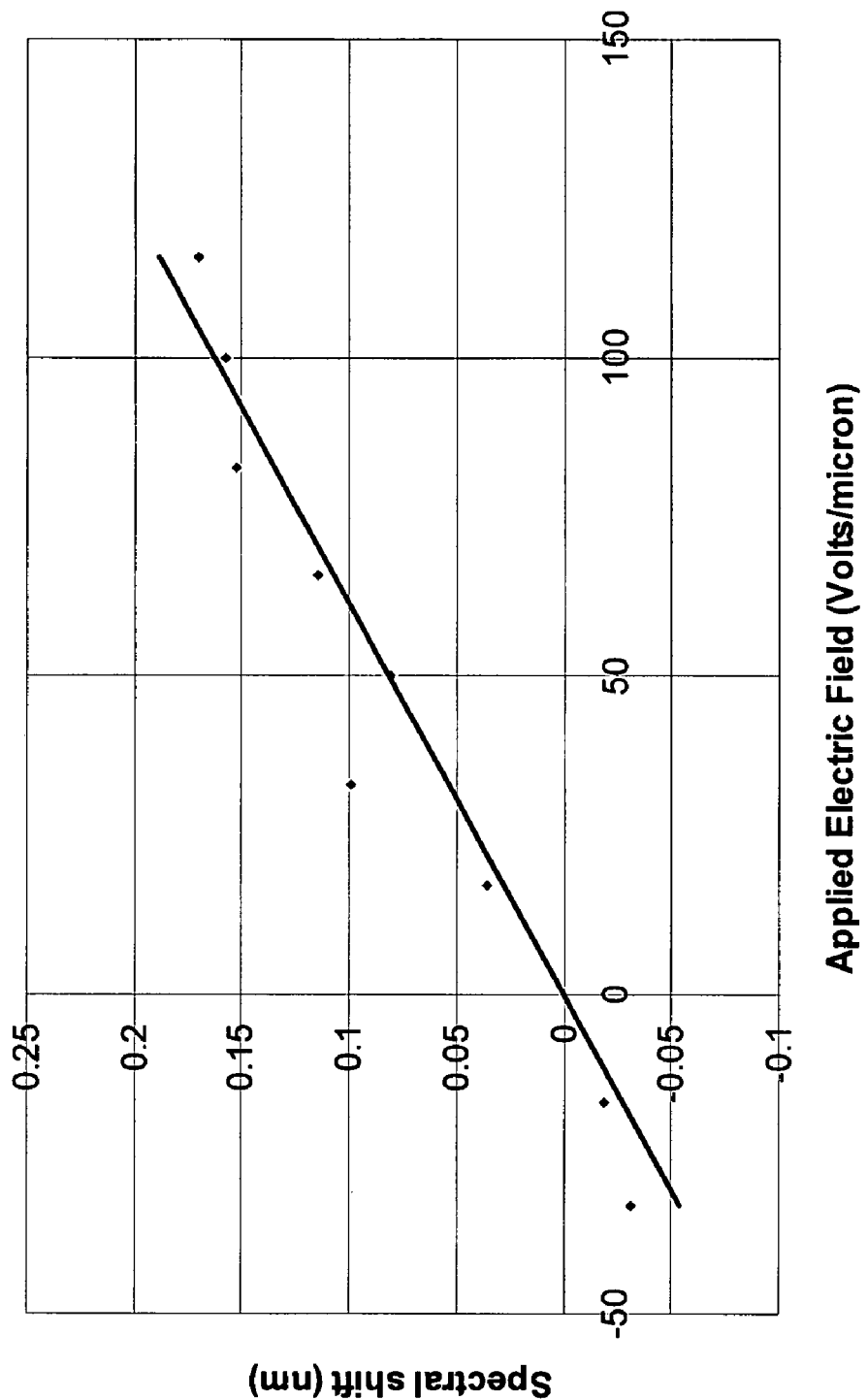
FIG. 5 is a graph of applied electric field (volts/micron) versus spectral shift (nm) that shows the linear change in the spectral shift (as depicted in FIG. 4) due to the applied field.

4 and 5, and the experiments themselves are described in the Example that follows. FIG. 4 shows the spectral shift in Bragg wavelength due to an applied electric field in a poled sample of the dinitro analog of polyimide-dialkyl amino nitro diazo (depicted in FIG. 2C). For this study, the device comprised a single grating. The leftward trough at about 1560.25 microns exemplifies the situation where there was no electric field applied to the grating. The rightward trough at about 1560.45 microns exemplifies the situation where the grating was biased positive, i.e., a positive electric field was communicated to the grating by applying positive voltage to the electrode controlling the grating, at about 116 volts/micron. FIG. 5 shows the linear change in the spectral shift due to the applied field. The data were calculated based on the results depicted in FIG. 4.

Figure 6:
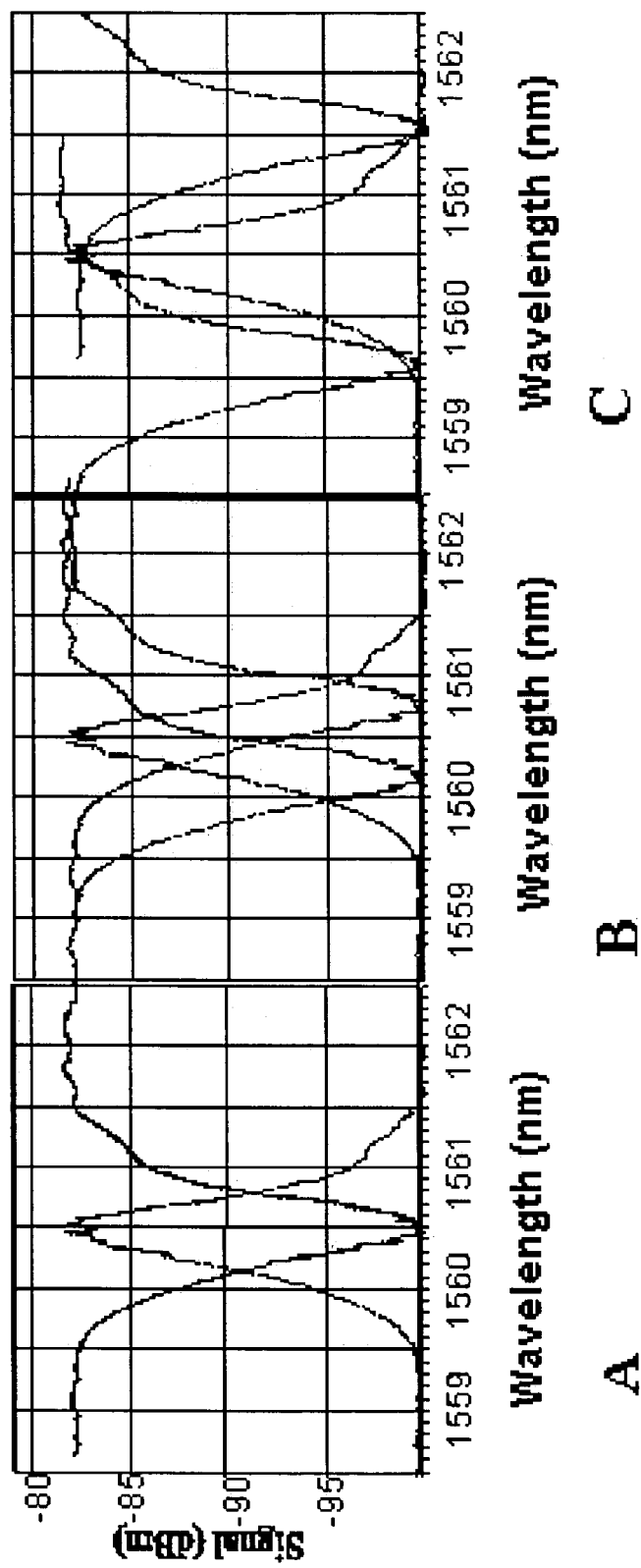
FIGS. 6A–6C are graphs of wavelength (nm) versus signal (dBM) that depict the phenomenon underlying the gratings-based optical attenuator and/or modulator having two gratings. Namely.

FIG. 6 depicts the phenomenon underlying the gratings-based optical attenuator and/or modulator having two gratings. The concept is the same for a single grating where opposite electric fields are communicated to separate ends. As depicted in FIG. 6A, the device preferably is constructed such that when no voltage is applied to the electrodes controlling each grating (and consequently, no electric fields are communicated to each grating), no light is transmitted. This is because the resonance frequencies overlap: the trough at about 1560.5 nm in FIG. 6A depicts the overlapping signals from the two gratings, whereas the peak at about 1560.5 nm in FIG. 6A depicts the signal from the waveguide. Biasing each grating with opposite fields (i.e., applying a positive voltage to one electrode to communicate a positive electric field to one grating, and applying a negative voltage to another electrode to communicate a negative electric field to the other grating) shifts the spectral windows obtained for each grating in opposite directions but does not impact the waveguide signal, as depicted in FIG. 6B (with the signal from the gratings indicated by the troughs at about 1560.2 nm and 1560.8 nm, and the peak at about 1560.5 indicating the waveguide signal). Increasing the voltage applied to each electrode, and consequently the magnitude of electric field applied to each grating, shifts the spectral windows of each grating farther apart until all the spectral power of the existing channel is allowed to pass through (as depicted in FIG. 6C). Thus, the resultant spectral shifts due to the applied and opposite electric fields acts allows the device to function as either a light attenuator or light modulator. It is to be appreciated from this description that variation in the magnitude, nature (positive or negative) and/or timing of the voltage applied to the electrodes will vary the magnitude, direction and/or timing of the electric field supplied to the grating(s), and thus impact the attenuation or modulation obtained.

The devices of the invention thus are useful, among other things, in spectral flattening of the WDM amd DWDM network. The size of the double grating of FIG. 3 optionally is about 4 mm long and can be as narrow as the waveguide.

Accordingly, the present invention provides an optical device (e.g., either an optical modulator or an optical attenuator) that preferably comprises:
(a) a waveguide layer that includes a waveguide comprised of a second-order nonlinear optical polymer and at least a first and second grating;
(b) a first electrode positioned so as to communicate a negative electric field to the first grating upon application of a negative voltage to the first electrode; and
(c) a second electrode positioned so as to communicate a positive electric field to the second grating upon application of a positive voltage to the second electrode. Desirably the device further comprises one or more cladding layers. Optimally, the device further comprises a substrate layer. Optionally the device further comprises a ground.

In a preferred embodiment of the invention, preferably one of the gratings is tunable, and even more preferably, both of the gratings are tunable. Desirably the gratings are positioned next to each other along the waveguide layer, and are parallel, e.g., as depicted in FIG. 3.

In another preferred embodiment of the invention, preferably one of the gratings is comprised of a second-order nonlinear optical polymer. Even more preferably, both of the gratings are comprised of a second-order nonlinear optical polymer. Optionally, at least one of the gratings is comprised of a second-order nonlinear optical polymer that is the same as the polymer that comprises the waveguide present in the waveguide layer. Alternatively, preferably at least one of the gratings is comprised of a second-order nonlinear optical polymer that is different than the polymer that comprises the waveguide present in the waveguide layer.

In a particularly preferred embodiment according to the invention, preferably the optical device (e.g., either optical attenuator or optical modulator, especially variable optical attenuator or modulator) comprises:
(a) a waveguide layer that includes a waveguide comprised of a second-order nonlinear optical polymer and a first and second grating;
(b) a first electrode positioned so as to communicate a negative electric field to the first grating upon application of a negative voltage to the first electrode;
(c) a second electrode positioned so as to communicate a positive electric field to the second grating upon application of a positive second voltage to the second electrode;
(d) a substrate layer;
(e) a first cladding layer positioned between the first and second electrodes and the waveguide layer; and (f) a second cladding layer positioned between the waveguide layer and the substrate layer.

In yet another preferred embodiment according to the invention, the device preferably comprises a single grating. Thus, the invention provides an optical device that preferably comprises:
(a) a waveguide layer that includes a waveguide comprised of a second-order nonlinear optical polymer and at least one grating;
(b) a means for communicating a negative electric field to one end of the grating; and
(c) a means for communicating a positive electric field to the other end of the grating.

The invention also provides an optical device that preferably comprises:
(a) a waveguide layer that includes a waveguide comprised of a second-order nonlinear optical polymer and at least one grating;
(b) a first electrode positioned so as to communicate a negative electric field to one end of the grating upon application of a negative voltage to the first electrode; and
(c) a second electrode positioned so as to communicate a positive electric field to the other end of the grating upon application of a positive voltage to the second electrode.

Additionally, a preferred optical device comprises:
(a) a waveguide layer that includes a waveguide comprised of a second-order nonlinear optical polymer and at least one grating;

(b) a first electrode positioned so as to communicate a negative electric field to one end of the grating upon application of a negative voltage to the first electrode;

(c) a second electrode positioned so as to communicate a positive electric field to the other end of the grating upon application of a positive second voltage to the second electrode;

(d) a substrate layer;

(e) a first cladding layer positioned between the first and second electrodes and the waveguide layer; and (f) a second cladding layer positioned between the waveguide layer and the substrate layer.

Figure 7:
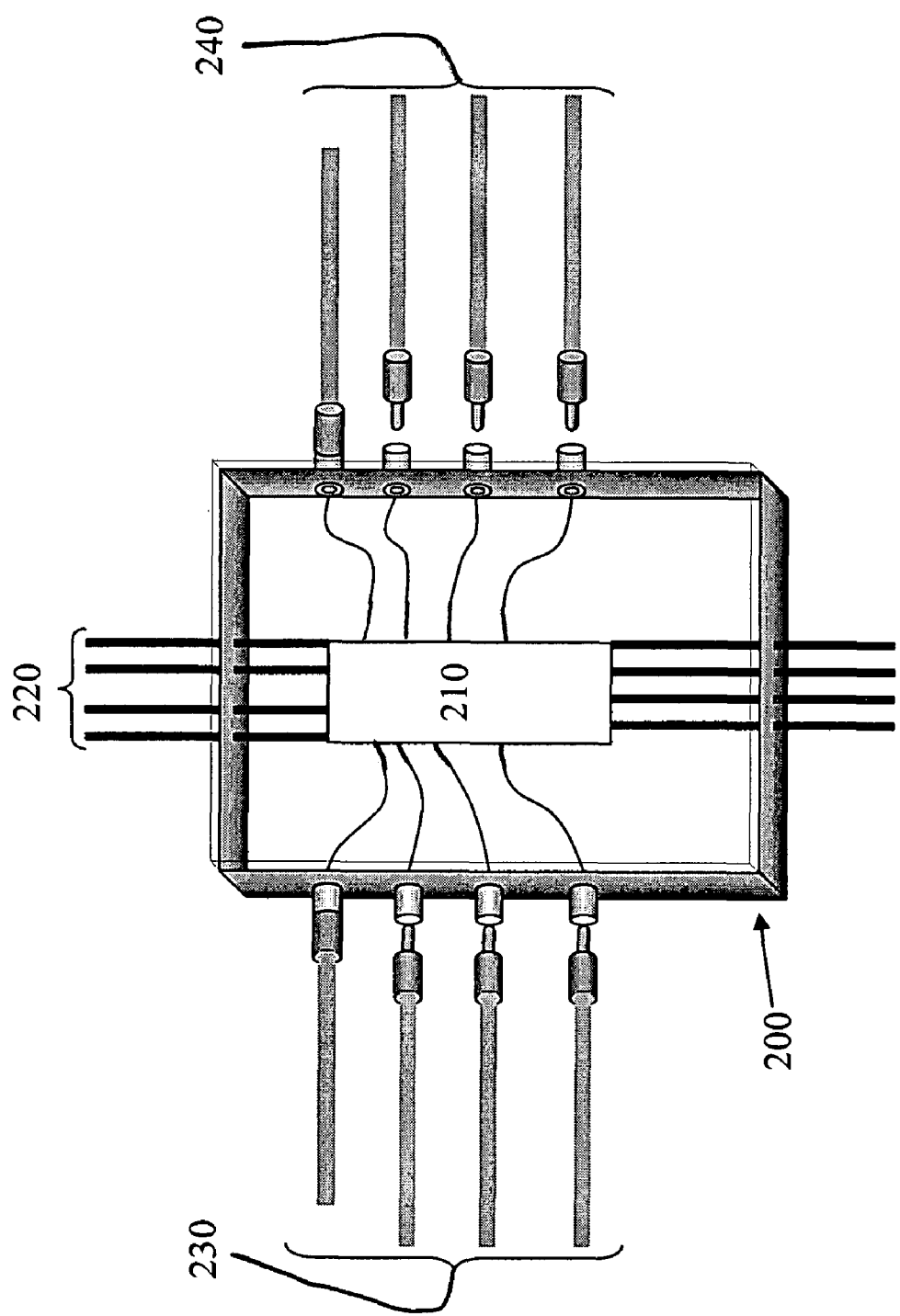
FIG. 7 is a schematic of a representative example of the packaging of the optical integrated circuit (OIC) components in a hermetic package. Symbols: 200, enclosure box; 210, optical circuit board; 220, electrical connections; 230, input optical fibers; 240, output optical fibers.

Furthermore, as discussed previously, the present invention also comprises arrays of such preferred devices. For instance, tens, hundreds, or thousands of such gratings can be fabricated on a single entity, e.g., 2×2 cm optical chip, and packaged. One exemplary illustration of such packaging is depicted in FIG. 7. Since the device response is based on the electro-optic effect, it can operate in the gigaHertz regime. Such a device can be used as a light attenuator, but also can be employed as a light modulator for telecommunication applications by modulating the gratings back and forth by an applied modulated voltage.

The invention also provides methods of using the preferred devices to modulate or attenuate light, as described herein. In a particularly preferred embodiment, the invention provides a method for modulating or amplifying light traveling along a waveguide, wherein the method comprises the steps of:

(a) applying an optical signal to a waveguide that is comprised of a second-order nonlinear optical polymer and contains a first and second grating;

(b) applying a negative voltage to a first electrode positioned so as to communicate a negative electric field to the first grating; and (c) applying a positive voltage to a second electrode positioned so as to communicate a positive electric field to the second grating.

In another preferred embodiment, the invention provides a method for modulating or amplifying light traveling along a waveguide, wherein the method comprises the steps of:

(a) applying an optical signal to a waveguide that is comprised of a second-order nonlinear optical polymer and at least one grating;

(b) applying a negative voltage to a first electrode positioned so as to communicate a negative electric field to one end of the grating; and (c) applying a positive voltage to a second electrode positioned so as to communicate a positive electric field to the other end of the grating.

Materials for the Construction of the Optical Devices

A multi-functional optical switch (e.g., one of a family of members) is represented in FIG. 1. In this device, two signal-carrying waveguides $n_1$ and $n_3$ are separated by a cladding layer $n_2$. Wavelengths $\lambda_1$ and $\lambda_2$ flow in the first waveguide, $n_1$. A bias across the electrodes (+/−) that is communicated to the grating will induce a refractive index change in the second-order nonlinear optical polymer comprising the grating, filtering one of the channels, and coupling it into the second waveguide, $n_3$. The construction of such a device is described in PCT International Application No. WO 01/06305, incorporated by reference for its teaching with regard to the disclosure of this and other devices, and their method of operation. For constructing the multi-functional optic switch, preferably at least two stable cis-trans-active NLO polymers (e.g., one or more of the polymers depicted in FIG. 2) are employed which have separate, and preferably far apart, absorption peaks.

The materials employed to construct the attenuators and modulators of the invention, similar to those described for construction of the multi-functional optic switch, preferably have a high electro-optic coefficient, optimally undergo efficient cis-trans isomerization, and desirably are transparent (or nearly transparent) at 1.5 microns wavelength. This cis-trans isomerization preferably induces directional alignment in the chromophore perpendicular to the polarization of the exciting light which reduces absorption, and which facilitates fabrication. The chromophores preferably are chemically attached to the host (backbone) polymer for better thermal stability, as opposed to, e.g., doping of the polymer. Soluble polyimides preferably are used as host or backbone material. The polymeric structure preferably is as described in PCT International Application No. WO 01/06305, or is a modification of these polymers However, other suitable backbone materials and/or chromophores can be employed for the modulators and/or attenuators of the invention. Moreover, doped polymers optionally can be employed for the waveguide and/or gratings.

Figure 2:
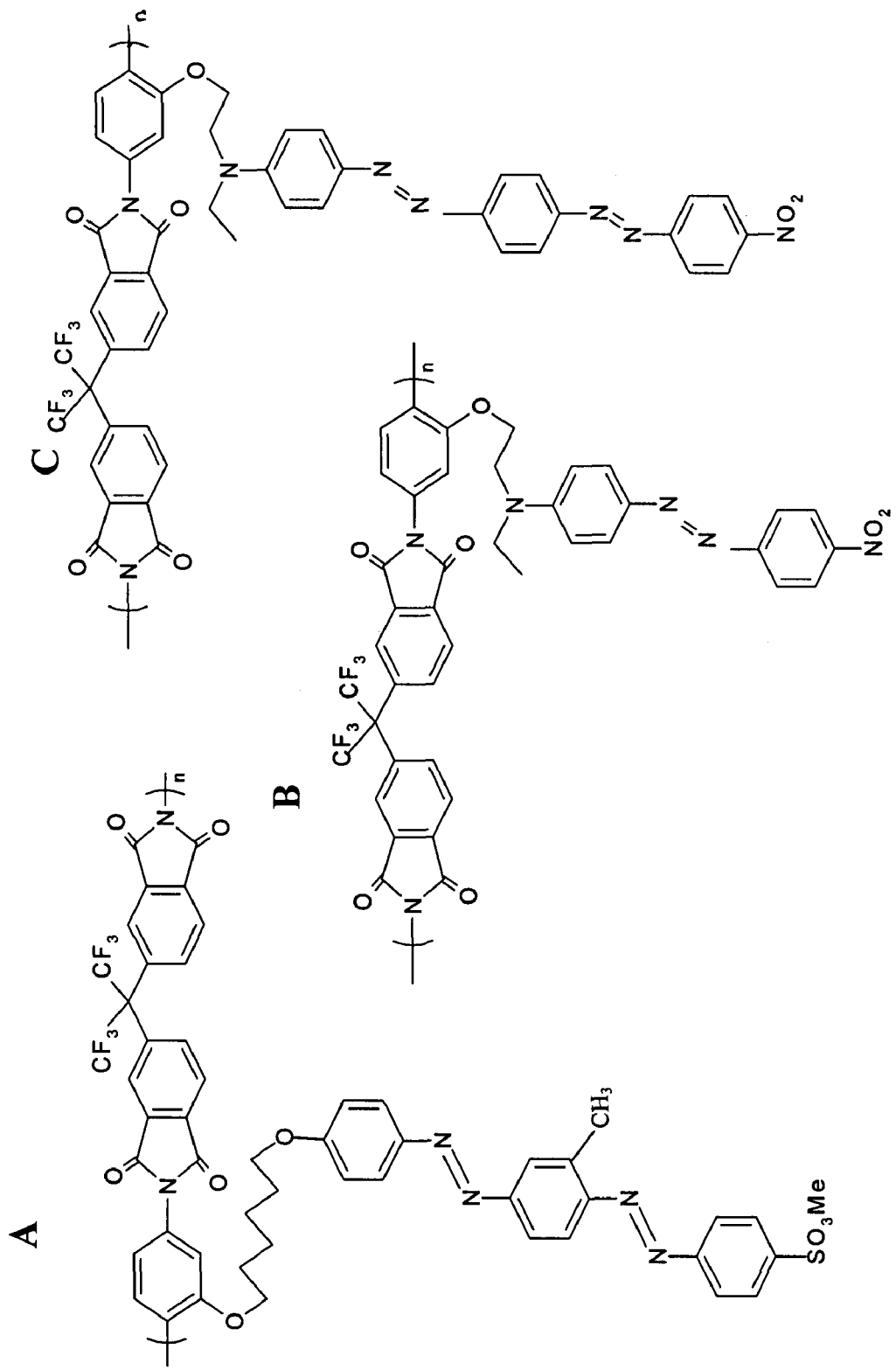
FIG. 2 depicts the chemical structure of some preferred second-order nonlinear optical polymers that can be employed for the exemplary variable optical attenuators and/or modulators of the invention: (A) chemical structure of a modified form of polyimide-alkoxy sulfone diazo; (B) chemical structure of polyimide-dialkyl amino nitro azo; (C) chemical structure of polyimide-dialkyl amino nitro diazo. Symbol: n, ranges from about 20 to about 600.

In particular, the three exemplary materials shown in FIG. 2 all contain azo chromophores with different absorption bands. To enable optical fabrication of waveguides and components in two different independent layers, polymers were synthesized that have absorption peaks separate from each other. One group of chromophores that were synthesized are so called "blue absorbing" such as modified polyimide-hydroxy-diazo-sulfone (FIG. 2A), and polyimide-amine-azo-nitro (FIG. 2B). These materials undergo cis-trans isomerization when excited anywhere within their respective absorption bands with a non-zero absorption value. No cis-trans isomerization occurs outside of this range. Therefore, the blue absorbing material will not undergo cis-trans isomerization at, for example, 650 nm. By comparison, use of a material such as polyimide-amine-diazo-dinitro (FIG. 2C) with absorption extending to 650 nm, allows the writing of waveguides and features in this material at, for example, a 632 nm wavelength, which will not affect waveguides and features in the modified polyimide-hydroxy-diazo-sulfone. Conversely, by writing at a 380 nm wavelength, polyimide-amine-diazo-dinitro will not be affected. This allows independent writing of waveguides in each layer without affecting the other layer.

Thus, in a preferred embodiment, the present invention provides an optical device (e.g., an optical attenuator or modulator, especially a variable optical attenuator or modulator), wherein the waveguide layer preferably comprises a polymer selected from the group consisting of modified polyimide-hydroxy-diazo-sulfone, polyimide-amine-azo-nitro and polyimide-amine-diazo-dinitro.

According to the invention, optionally any appropriate azo chromophore can be employed. For instance, preferably the azo chromophore is an azo chromophore as set forth in PCT International Application WO 02/33005 (hereby incorporated by reference in its entirety for its teachings regarding same). Furthermore, rather than an azo chromophore, a structurally similar stilbene chromophore (e.g., a chromophore having at least one carbon double bonded to another carbon and each attached to a benzene ring) optionally can be used instead. For instance, stilbene chromophores such as described in U.S. Patent Application Publication No. U.S.-2002-0009274, or modifications of those chromophores, can be used (hereby incorporated by reference in its entirety for its teachings regarding same). Other chromophores known in the art similarly can be employed, especially azo and stilbene chromophores marketed by Trans Photonics LLC (Chicago, Ill.) or Shayda Technologies, Inc. (Chicago, Ill.).

Thus, in another preferred embodiment, the present invention provides an optical device (e.g., an optical attenuator or modulator, especially a variable optical attenuator or modulator), wherein preferably the second-order nonlinear optical polymer comprising the waveguide layer has the structure

where Z is a polymer backbone, S is a spacer attached to Z, and C is an azo or stilbene chromophore. Any azo or stilbene chromophore allowing appropriate device function can be employed for the waveguide layer. In such an optical device, preferably Z is a polyimide having the structure

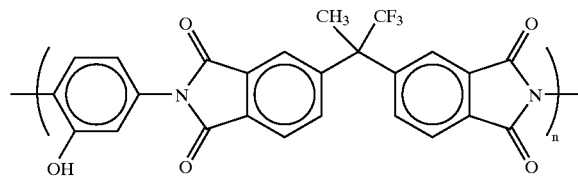

where n ranges from about 20 to about 600. Also, preferably S is a carbon chain comprising from 0 to about 30 atoms. In a particularly preferred embodiment, preferably C is dialkyl-amino-sulfone-stilbene. However, instead of the chromophore (C) being chemically attached to the polymer backbone (Z) by way of a spacer (S), the polymer can be doped with the chromophore to comprise the 2°-NLO polymer. Moreover, Z can be any appropriate polymer backbone, S (if present) can be any appropriate spacer, and C can be any appropriate chromophore, and especially as described in PCT International Application WO 01/06305.

In terms of cladding, the refractive index of a light-guiding layer preferably is higher than that of the layers above and below it. A multi-layer device e.g., an optical attenuator or optical modulator having more than a single waveguide layer, can be fabricated. To fabricate a multi-layer device comprising core 1 (or a first waveguide, $n_1$, as depicted in (FIG. 1A)) and core 2 (or a second waveguide, $n_3$, as depicted in (FIG. 1A) as two guiding layers, the core layers preferably are separated by a cladding layer. In the case of a single-core layer device, e.g., an optical attenuator or optical modulator having a single waveguide layer, cladding optionally can be employed on either side of the waveguide layer. By imidizing pure poly-amic acid, an insoluble layer with lower refractive index than either core 1 or core 2, or the single core, is formed.

For single mode waveguide fabrication (e.g., as described in PCT International Application No. WO 01/06305) the core and cladding need to have close values. A library of preferred polyimide cladding material that can be employed for the devices is shown in Table 1, allowing fabrication of a single-mode waveguide by appropriate choice of cladding material and curing temperature. In Table 1 below, "n" preferably ranges from about 10 to about 1000, and even more desirably, ranges from about 20 to about 600.

TABLE 1

Structure and refractive index values of some of the cladding material used in device fabrication

| | Polyamic acid | Heat → | polyimide | Refractive Index | | |
|---|---|---|---|---|---|---|
| | | | | @ 60° C. | @ 100° C. | @ 200° C. @ 250° C. |
| a | | | | 1.538 | 1.551 | 1.608 |
| b | | | | 1.618 | 1.626 | 1.665 |
| c | | | | | 1.563 | 1.655 |

TABLE 1-continued

Structure and refractive index values of some of the cladding material used in device fabrication

| | Polyamic acid | Heat polyimide | Refractive Index | | | |
|---|---|---|---|---|---|---|
| | | | @ 60° C. | @ 100° C. | @ 200° C. | @ 250° C. |
| d | [structure] | [structure] | 1.617 | 1.638 | | 1.648 |
| e | [structure] | [structure] | 1.582 | 1.598 | 1.641 | 1.658 |

Chromophore-containing core materials are more conducting that the pure polyimide backbone, especially at elevated temperatures. Accordingly, preferably polymers such as carbazole-containing polyimides preferably can be employed as cladding material (e.g., to improve poling and the electro-optic coefficient). Carbazole-containing claddings are more conducting than the core, and thus will concentrate the electric field inside the core layer during heating and poling and will enhance the poling efficiency of the core material.

In addition to the references cited above, the following further publications and patents applications can be consulted regarding materials that optionally can be employed for fabricating the modulators and attenuators of the invention, and are hereby incorporated by reference in their entirety for their teachings regarding polymer (particularly polyimide) structure and modification (especially with regard chromophores that can be incorporated in polymers), synthesis, and incorporation into waveguides, and regarding chromophore structure and synthesis: Yu et al., *Macromolecules*, 28, 784 (1995); Yu et al., *Appl. Phys. Lett.*, 66, 1050 (1995); Yu et al., *ASC Symposium Series* No. 601, Chapter 13, 172 (1995); Yu et al., *Polymer Preprints*, 36, 39 (1995); Yu et al., *SPIE Proceedings*, 2527, (1995); Yu et al., *J. Am. Chem. Soc.*, 117, 11680, (1995); Yu et al., *Macromolecules;* 29, 6139–6142 (1996); Yu et al., *Accounts of Chemical Research*, 29(1), 13–21 (1996); Saadeh et al., *Macromolecules;* 30(18) 5403–5407; (1997); *Advanced Materials* 10(12) 927–931 (1998); Saadeh et al., *Polymer Preprints*, 38, 552 (1997); Saadeh et al., *J. Mater. Chem.* 9, 1865 (1999); Saadeh et al., *Macromolecules*, 33, 1570 (2000); Sekkat et al., *Chem. Mater.*, 7, 142–147 (1995); PCT International Application WO 01/06240; and U.S. Patent Application Publication No. U.S.-2002-0009274.

Methods for the Construction of the Optical Devices

Waveguides present in the waveguide layer of the optical attenuators and optical modulators according to the invention preferably can be fabricated as previously described. In particular, waveguides can be fabricated using the apparatuses and methods described in PCT International Application No. WO 01/06305, particularly in Examples 3 and 4 of this reference (PCT International Application No. WO 01/06305, incorporated by reference for its teachings regarding waveguide fabrication, particularly as set forth in Examples 3 and 4). Preferably waveguide fabrication is done by laser writing. The types of waveguides that are particularly preferred for the modulators and attenuators of the invention are the symmetric waveguides where the top and bottom layers and either side of the waveguide have the same refractive index as each other, but different than that of the waveguide itself.

The gratings preferably are formed by holographic means, especially as described in PCT International Application No. WO 01/06305, particularly in Example 5 of this reference (PCT International Application No. WO 01/06305, incorporated by reference for its teachings regarding grating fabrication, particularly as set forth in Example 5). Optionally a grating is produced using this method and apparatus, wherein the period of the grating is measured by moving the grating formed against the interference pattern and measuring the intensity modulation of the diffracted light. Optionally, gratings can be written by tilting the sample during grating writing to produce tilted (or blazed) gratings. The sample tilting is easily done by providing an axis of rotation at where the grating is written. This optimally can be employed to increase the in/out coupling of guided modes.

In terms of the theoretical basis of using gratings, making use of the Pockels effect, the refractive index of the 2°-NLO polymers can be changed by an applied external field according to the formula:

$$\Delta n_{TE} = n^3_{TE} r_{13} E/2 \text{ and } \Delta n_{TM} = n^3_{TM} r_{33} E/2$$

where $r_{13}$ is the electrooptic tensor coefficient, E is the applied electric field, $n_{TE}$ is the refractive index of transverse electric wave, $\Delta n_{TE}$ is the change in medium refractive index of transverse electric wave, $n_{TM}$ is the refractive index of transverse magnetic wave, $\Delta n_{TM}$ is the change in medium refractive index of transverse magnetic wave, and $r_{33}$ is the electrooptic coefficient with the units of picometer/volt. (Levy et al., "Reflection Method for Electro-optical Coefficient Determination in Stratified Thin film structures", *Mol. Cryst. Liq. Cryst. Sci. Technol.- Sec. B: Nonlinear Optics*, 4, Pages 1–19 (1993); Reinisch et al., "Fast Pockels Light Modulator Using guided wave resonance", *Applied Optics*, 24, 2001 (1985)). The Bragg wavelength is given by $$\lambda_B = 2\Lambda n \text{ and } \Delta\lambda_B = 2\Lambda\Delta n$$

(assuming grating period, $\Lambda$, constant). Therefore as n shifts, so does $\lambda_B$. Of course the higher the second-order nonlinearity, the larger the shift in $\lambda_B$.

Exemplary attenuators and modulators as described herein thus optionally can be obtained by following the preferred steps below:

(1) preferably, synthesizing polymeric material for core and cladding layers;
(2) optionally, forming core layer films on cladding, and doing, e.g., in situ poling;
(3) preferably, spin-coating top cladding on poled films, and optionally polishing the ends;
(4) preferably, laser writing waveguides on the single layer film, e.g., with a blue laser or other laser;
(5) optionally, attaching fibers to the waveguide ends; and
(6) preferably, writing and optimizing Bragg gratings in situ to make, e.g., optical attenuators and/or modulators, and sputter top ITO electrodes.

The gratings-based modulators and attenuators can be tested and then marketed. Optionally, the steps above can be repeated (e.g., with use of different polymers and different lasers for waveguide writing) to obtain different attenuators and modulators, to obtain attenuators and modulators comprised of more than one layer, and/or to obtain arrays of attenuators and modulators. Moreover, the gratings optionally can be written in the devices in such a fashion so as to obtain one or more tilted gratings. Also, the attenuators and modulators can be incorporated with other elements, e.g., optical switches.

The invention now will be described with reference to the following Example. The Example is by way of illustration only, not limitation. Of course, variation of the Example in the spirit and scope of the invention is intended.

EXAMPLE

A variation of polyimide-dialkyl amino nitro diazo was prepared and poled for the grating writing experiment. This specific sample had a electrooptic coefficient ($r_{33}$) of 3 pm/v for a TM propagating mode. The total thickness of the sample (distance between electrodes) was about 6 $\mu$m. A positive high voltage was applied to the electrodes and the spectral shifts in the Bragg grating was recorded with an optical spectrum analyzer. The corresponding shift as calculated from the spectra (using the above equations) gives an effective $r_{33}$ value of 1 pm/v (this is because the excited mode in the waveguide was TE and the effective $r_{33}$ for TE mode is ⅓ of the TM mode). For a TM excited mode the same sample would have given tree times the shift. Due to the high voltage applied (700 V) the electrodes ultimately shorted. For material such those listed in Table 1, if the grating is designed for resonance condition for the wavelength λ, then a small bias across the grating will shift the resonance enough so that the central wavelength of the grating will shift more. If the grating is designed so that the coupling is slightly off resonance, a small bias across the grating will change the index of the second-order nonlinear optical polymer waveguide to tune in the resonance condition for wavelength λ. This configuration therefore, can act like a modulator, a filter and a reflector. The bandwidth of a given channel in the 1.5 μm optical communication band is typically a fraction of a nanometer. Therefore the active grating(s) according to the invention preferably tune over the range of a nanometer. Assuming a 2 μm thick film and using polyimide-dialkyl amino nitro diazo (or a modification thereof) with an $r_{33}$ of 35 pm/V and a grating period, Λ of 0.3 μm and wavelength of 1.5 μm the applied voltage across the film of ±38 volts will give a tunability of ±1 nm or total of 2 nm. Depending on the system, this is the equivalent of 4 or more channels. The shift is depicted in FIG. 4, and is shown to vary linearly with voltage as shown in FIG. 5.

All the references cited herein are hereby incorporated in their entireties by reference.

While the present invention has been described in terms of specific embodiments, it is understood that variations and modifications will occur to those in the art, all of which are intended as aspects of the present invention. Other similar modifications should be apparent as well. Modifications of the optical attenuator and or modulator (e.g., the variable optical attenuator and/or modulator) can be made without parting from the spirit and scope of the invention. Accordingly, this invention includes all modifications encompassed within the spirit and scope of the invention.

What is claimed is:

1. An optical device which is an optical attenuator or an optical modulator, the optical device comprising:
   (a) a waveguide layer that includes a waveguide comprised of a second-order nonlinear optical polymer and at least a first and second grating;
   (b) means for communicating a negative electric field to said first grating; and
   (c) means for communicating a positive electric field to said second grating.

2. An optical device which is an optical attenuator or an optical modulator, the optical device comprising:
   (a) a waveguide layer that includes a waveguide comprised of a second-order nonlinear optical polymer and at least a first and second grating;
   (b) a first electrode positioned so as to communicate a negative electric field to said first grating upon application of a negative voltage to said first electrode; and
   (c) a second electrode positioned so as to communicate a positive electric field to said second grating upon application of a positive voltage to said second electrode.

3. The optical device according to claim 2, wherein said device further comprises one or more cladding layers.

4. The optical device according to claim 2, wherein said device further comprises a substrate layer.

5. The optical device according to claim 2, wherein one of said gratings is tunable.

6. The optical device according to claim 2, wherein both of said gratings are tunable.

7. The optical device according to claim 2, wherein one of said gratings is comprised of an optical nonlinear second-order polymer.

8. The optical device according to claim 2, wherein both of said gratings are comprised of an optical nonlinear second-order polymer.

9. The optical device according to claim 2, wherein at least one of said gratings is comprised of an optical nonlinear second-order polymer that is the same as said polymer that comprises said waveguide.

10. The optical device according to claim 2, wherein at least one of said gratings is comprised of an optical nonlinear second-order polymer that is different than said polymer that comprises said waveguide.

11. The optical device according to claim 2, which further comprises a ground.

12. The optical device according to claim 2, wherein said optical nonlinear second-order polymer is selected from the group consisting of modified polyimide-hydroxy-diazo-sulfone, polyimide-amine-azo-nitro and polyimide-amine-diazo-dinitro.

13. The optical device according to claim 2, wherein said optical nonlinear second-order polymer has the structure wherein Z is a polymer backbone, S is a spacer attached to Z, and C is an azo or stilbene chromophore.

14. The optical device according to claim 13, wherein Z is where n ranges from about 20 to about 600.

15. The optical device according to claim 13, wherein S is a carbon chain comprising from 0 to 30 atoms.

16. The optical device according to claim 13, wherein C is dialkylamino-sulfone-stilbene.

17. An optical device which is an optical attenuator or an optical modulator, the optical device comprising:
   (a) a waveguide layer that includes a waveguide comprised of a second-order nonlinear optical polymer and a first and second grating;
   (b) a first electrode positioned so as to communicate a negative electric field to said first grating upon application of a negative voltage to said first electrode;
   (c) a second electrode positioned so as to communicate a positive electric field to said second grating upon application of a positive second voltage to said second electrode;
   (d) a substrate layer;
   (e) a first cladding layer positioned between said first and second electrodes and said waveguide layer; and
   (f) a second cladding layer positioned between said waveguide layer and said substrate layer.

18. An optical device which is an optical attenuator or an optical modulator, the optical device comprising:
   (a) a waveguide layer that includes a waveguide comprised of a second-order nonlinear optical polymer and at least one grating;
   (b) a means for communicating a negative electric field to one end of said grating; and
   (c) a means for communicating a positive electric field to the other end of said grating.

19. An optical device which is an optical attenuator or an optical modulator, the optical device comprising:
   (a) a waveguide layer that includes a waveguide comprised of a second-order nonlinear optical polymer and at least one grating;
   (b) a first electrode positioned so as to communicate a negative electric field to one end of said grating upon application of a negative voltage to said first electrode; and
   (c) a second electrode positioned so as to communicate a positive electric field to the other end of said grating upon application of a positive voltage to said second electrode.

20. An optical device which is an optical attenuator or an optical modulator, the optical device comprising:
(a) a waveguide layer that includes a waveguide comprised of a second-order nonlinear optical polymer and at least one grating;
(b) a first electrode positioned so as to communicate a negative electric field to one end of said grating upon application of a negative voltage to said first electrode;
(c) a second electrode positioned so as to communicate a positive electric field to the other end of said grating upon application of a positive second voltage to said second electrode;
(d) a substrate layer;
(e) a first cladding layer positioned between said first and second electrodes and said waveguide layer; and
(f) a second cladding layer positioned between said waveguide layer and said substrate layer.

21. A method for modulating light traveling along a waveguide comprising the steps of:
(a) applying an optical signal to a waveguide that is comprised of a second-order nonlinear optical polymer and contains a first and second grating;
(b) applying a negative voltage to a first electrode positioned so as to communicate a negative electric field to said first grating; and
(c) applying a positive voltage to a second electrode positioned so as to communicate a positive electric field to said second grating.

22. A method for modulating light traveling along a waveguide comprising the steps of:
(a) applying an optical signal to a waveguide that is comprised of a second-order nonlinear optical polymer and at least one grating;
(b) applying a negative voltage to a first electrode positioned so as to communicate a negative electric field to one end of said grating; and
(c) applying a positive voltage to a second electrode positioned so as to communicate a positive electric field to the other end of said grating.

* * * * *